(12) United States Patent
Wagoner et al.

(10) Patent No.: US 10,630,215 B2
(45) Date of Patent: Apr. 21, 2020

(54) SYSTEM AND METHOD FOR OPERATING A DOUBLY FED INDUCTION GENERATOR SYSTEM TO REDUCE HARMONICS

(71) Applicant: General Electric Company, Schenectady, NY (US)

(72) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/817,502

(22) Filed: Nov. 20, 2017

(65) Prior Publication Data

US 2019/0158001 A1    May 23, 2019

(51) Int. Cl.

| | |
|---|---|
| H02P 9/00 | (2006.01) |
| H02M 5/458 | (2006.01) |
| H02P 29/50 | (2016.01) |
| H02M 7/493 | (2007.01) |
| H02P 9/10 | (2006.01) |

(52) U.S. Cl.
CPC .......... *H02P 9/007* (2013.01); *H02M 5/4585* (2013.01); *H02M 7/493* (2013.01); *H02P 9/102* (2013.01); *H02P 9/107* (2013.01); *H02P 29/50* (2016.02); *H02P 2201/13* (2013.01)

(58) Field of Classification Search
CPC ........... H02P 9/007; H02P 9/102; H02P 9/107
See application file for complete search history.

(56) References Cited

U.S. PATENT DOCUMENTS

| | | | |
|---|---|---|---|
| 4,870,339 A | * | 9/1989 | Furukawa ............... H02P 9/007 322/29 |
| 8,138,620 B2 | | 3/2012 | Wagoner et al. |
| 9,337,685 B2 | | 5/2016 | Wagoner et al. |
| 9,537,437 B2 | | 1/2017 | Wagoner et al. |

(Continued)

FOREIGN PATENT DOCUMENTS

| | | |
|---|---|---|
| CN | 101710715 A | 5/2010 |
| WO | WO 2017039090 A1 | 3/2017 |

OTHER PUBLICATIONS

European Search Report dated Apr. 16, 2019.

*Primary Examiner* — Sean Gugger
(74) *Attorney, Agent, or Firm* — Dority & Manning, P.A.

(57) ABSTRACT

A DFIG power system defines a generator power path and a converter power path. The generator power path has a DFIG with a rotor and a stator. The converter power path has a power converter with a rotor-side converter coupled to a line-side converter via a DC link. The power converter has at least two power bridge circuits connected in parallel. A method of operating the DFIG power system includes monitoring, via one or more sensors, at least one electrical condition thereof. The method also includes comparing, via a control system, the at least one electrical condition to a predetermined threshold, the predetermined threshold being indicative of an occurrence of a transient overloading event. Further, the method includes alternating between non-interleaving and interleaving intervals if the at least one electrical condition exceeds the predetermined threshold so as to reduce harmonics of the DFIG power system.

12 Claims, 7 Drawing Sheets

(56) References Cited

U.S. PATENT DOCUMENTS

| | | | |
|---|---|---|---|
| 2002/0079706 A1* | 6/2002 | Rebsdorf | H02P 9/007 290/55 |
| 2006/0163881 A1* | 7/2006 | Bucker | H02P 9/007 290/44 |
| 2006/0192390 A1* | 8/2006 | Juanarena Saragueta | H02P 6/005 290/44 |
| 2010/0314872 A1* | 12/2010 | Wagoner | H02M 5/4585 290/44 |
| 2011/0013433 A1* | 1/2011 | Wagoner | H02M 1/15 363/123 |
| 2011/0140430 A1 | 6/2011 | Ritter et al. | |
| 2011/0309875 A1 | 12/2011 | Wei et al. | |
| 2013/0076150 A1* | 3/2013 | Wagoner | H02M 3/1584 307/82 |
| 2013/0301327 A1* | 11/2013 | Wagoner | H02M 1/126 363/132 |
| 2014/0036553 A1* | 2/2014 | Permuy | H02H 7/06 363/34 |
| 2014/0049859 A1* | 2/2014 | Wagoner | H02J 3/00 361/18 |
| 2014/0203559 A1* | 7/2014 | Wagoner | H02M 5/4585 290/44 |
| 2014/0204630 A1 | 7/2014 | Wagoner et al. | |
| 2014/0204643 A1* | 7/2014 | Wagoner | H02M 7/5387 363/132 |
| 2014/0247021 A1* | 9/2014 | Wagoner | H02P 9/007 322/47 |
| 2017/0102421 A1* | 4/2017 | Ramirez | G01R 31/021 |
| 2017/0214335 A1* | 7/2017 | Basic | H02M 7/48 |

* cited by examiner

SYSTEM AND METHOD FOR OPERATING A DOUBLY FED INDUCTION GENERATOR SYSTEM TO REDUCE HARMONICS

FIELD

The present disclosure relates generally to power converters, and more particular to a system and method for operating a doubly fed induction generator (DFIG) system having a power converter with a plurality of power bridge circuits connected in parallel so as to reduce harmonics.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology. In such system, the generator stator is separately connected to the power grid via a main transformer.

The power converter usually includes several power semi-conductor switches such as insulated gate bipolar transistors (IGBTs), integrated gate commutated thyristors (IGCTs or GCTs), or metal oxide semiconductor field effect transistors (MOSFETs) that are switched at certain frequencies to generate the desired converter output voltage and frequency. The converter output voltage is then provided to various loads such as motors, power grids, resistive loads, etc.

In a DFIG system, where the stator is isolated from the power converter, a filter is generally provided between the stator and the grid to allow the stator voltage to be different from the converter voltage. Though such filters can reduce harmonics supplied from the DFIG to the power grid, they tend to be expensive.

Thus, the present disclosure is directed to systems and methods for operating a power converter having a plurality of power bridges connected in parallel in a DFIG system to reduce harmonics, but that eliminates or reduces size of the aforementioned stator filter.

BRIEF DESCRIPTION

Aspects and advantages of the invention will be set forth in part in the following description, or may be obvious from the description, or may be learned through practice of the invention.

In one aspect, the present disclosure is directed to a method for operating a doubly fed induction generator (DFIG) power system connected to a power grid. The DFIG power system defines a generator power path and a converter power path. The generator power path has a DFIG with a rotor and a stator. The converter power path has a power converter with a rotor-side converter coupled to a line-side converter via a DC link. The power converter has at least two power bridge circuits connected in parallel. The method includes monitoring, via one or more sensors, at least one electrical condition of the DFIG power system. The method also includes comparing, via a control system, the at least one electrical condition to a predetermined threshold, the predetermined threshold being indicative of an occurrence of a transient overloading event. Further, the method includes alternating between non-interleaving and interleaving intervals if the at least one electrical condition exceeds the predetermined threshold so as to reduce harmonics of the DFIG power system.

In another aspect, the present disclosure is directed to a doubly fed induction generator (DFIG) power system connected to a power grid. The DFIG power system includes a generator power path comprising a DFIG with a rotor and a stator and a converter power path having a power converter. The power converter includes a rotor-side converter coupled to a line-side converter via a DC link. Further, the power converter includes at least two power bridge circuits connected in parallel. The DFIG power system also includes one or more sensors for monitoring at least one electrical condition of the DFIG power system and a control system communicatively coupled to the sensor(s). Further, the control system is configured to perform one or more operations, including but not limited to comparing the electrical condition(s) to a predetermined threshold and alternating between non-interleaving and interleaving intervals when the electrical condition(s) is indicative of a transient overloading event so as to reduce harmonics of the DFIG power system. It should also be understood that the DFIG power system may further include any of the additional steps as described herein.

In yet another aspect, the present disclosure is directed to a method for operating a doubly fed induction generator (DFIG) power system connected to a power grid. The DFIG power system defines a generator power path and a converter power path. The generator power path has a DFIG with a rotor and a stator. The converter power path has a power converter with a rotor-side converter coupled to a line-side converter via a DC link. The power converter has at least two power bridge circuits connected in parallel. During a non-interleaving interval, the method includes operating the power bridge circuits with equal phase angles of the pulse width modulation (PWM) carrier frequency.

Alternatively, during an interleaving interval, the method includes interleaving phase angles of the at least two power bridge circuits to reduce harmonics of the DFIG power system. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
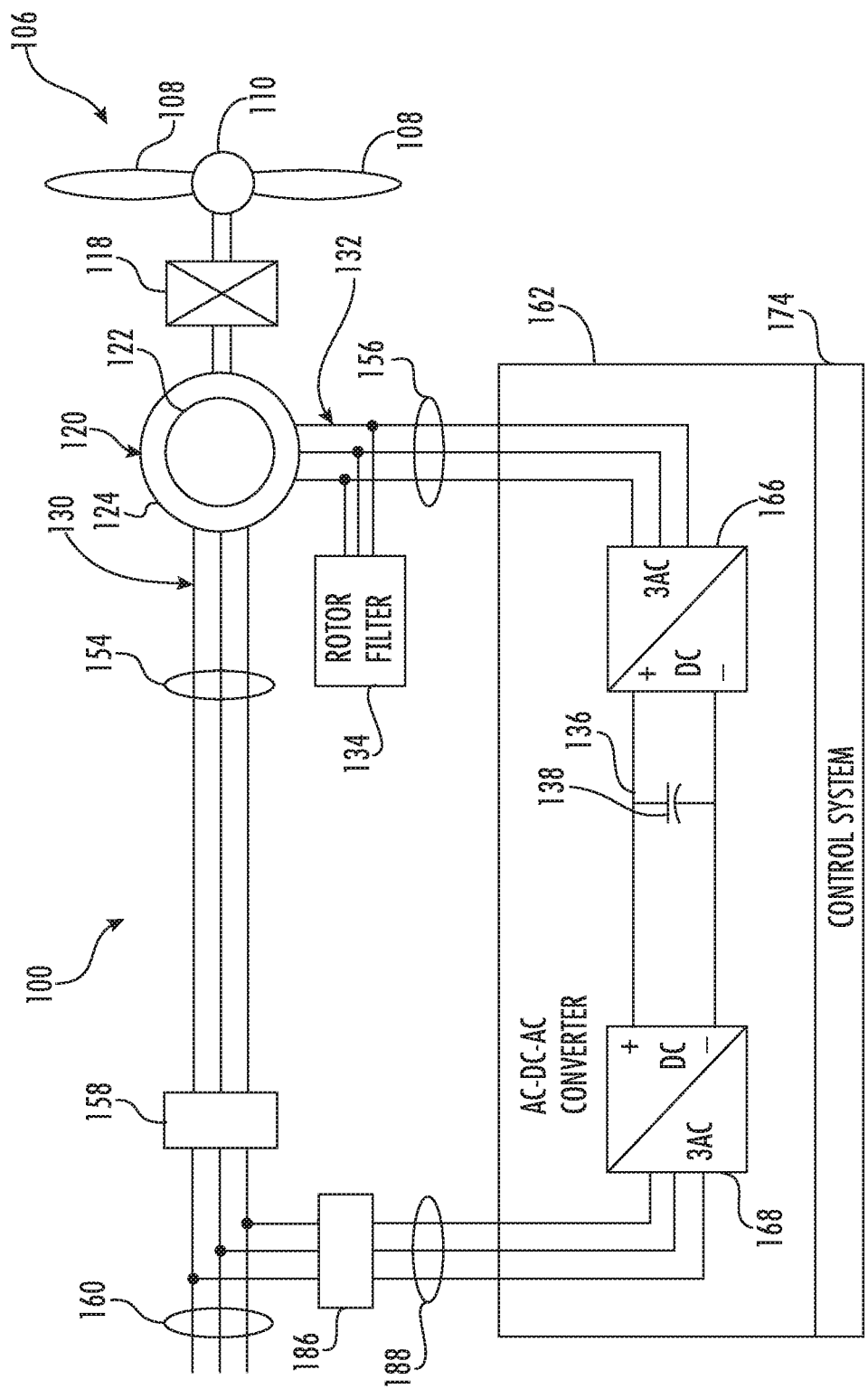
FIG. 1 illustrates one embodiment of an example renewable energy power system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In conventional DFIG systems, where the stator is isolated from the power converter, an expensive stator filter is required to allow the stator voltage to be different from the converter voltage. As such, the stator filter reduces harmonics supplied from the DFIG wind turbine to the power grid. Such systems also include IGBT bridges connected in parallel in order to provide a power converter with low cost and high reliability. Further, the power bridges are operated in a "non-interleaved" manner, where the interleave angles of the power bridges are essentially the same. The cost of such a system is a concern due to the high cost of the stator filter.

Thus, the present disclosure sets forth a novel method of optimizing a power converter with parallel power bridges in a system with a DFIG that reduces costs and improves reliability. More specifically, the present disclosure includes a power converter with at least two parallel power bridge circuits that utilizes IGBTs with a control scheme to operate the power bridge circuits to reduce harmonics by interleaving the phase angle of the power bridge circuits on and off. As such, the present system eliminates the expensive stator filter and replaces it with a rotor filter, thereby reducing the filter cost.

Accordingly, the present disclosure has many advantages not present in the prior art. For example, as compared to the stator filter, the low-voltage rotor components are more common, more available, include more sources, and are less expensive than the medium-voltage components on the stator side. As such, the power level of the rotor filter is much lower. Therefore, the inductor size of the rotor filter, where applicable, can be much smaller. Further, the harmonics of the present disclosure do not go through the DFIG, which reduces generator heating and allows for more power output from the DFIG. Moreover, interleaving the bridge circuits increases ripple current frequency and reduces ripple current, the size of the filter capacitor, and system costs.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120 having a rotor 122 and a stator 124. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

The power converter 162 includes a rotor-side converter 166 coupled to a line-side converter 168. The DFIG 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching elements, which are discussed in more detail herein. The rotor-side converter 166 and the line-side converter 168 can be coupled via a DC link 136 across which is the DC link capacitor 138. In alternative embodiments, the stator bus 154 and the power converter 162 may be connected to separate isolated windings of a transformer (not shown), i.e. at the junction of the generator breaker 158 and the converter breaker 186.

Figure 2:
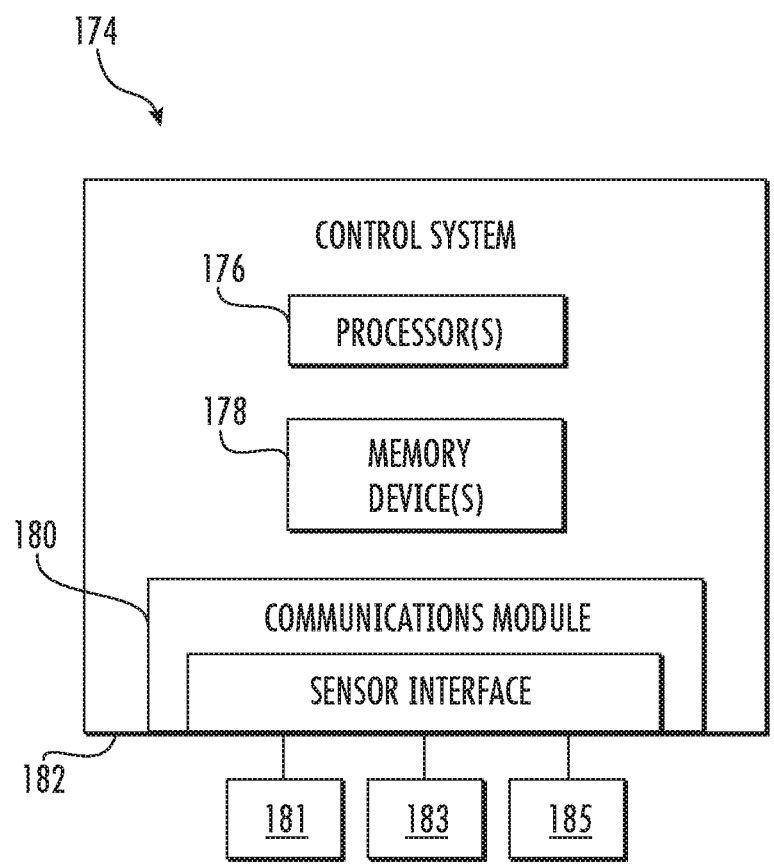
FIG. 2 illustrates a block diagram of one embodiment of a control system suitable for use with the renewable energy power system shown in FIG. 1.

The power converter 162 can be coupled to a control system 174 to control the operation of the rotor-side converter 166 and the line-side converter 168 and other aspects of the power system 100. For example, as shown particularly in FIG. 2, the control system 174 can include any number of control devices. In one implementation, for example, the control system 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power converter 162 and other aspects of the power system 100. Additionally, the control system 174 may also include a communications module 180 to facilitate communications between the control system 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the control system 174 to perform the various functions as described herein.

In operation, alternating current power generated at the DFIG 120 by rotation of the rotor 106 is provided via a dual path to an electrical grid 160. The dual paths are defined by a generator power path 130 and a converter power path 132. On the converter power path 132, sinusoidal multi-phase (e.g. three-phase) alternating current (AC) power is provided to the power converter 162 via the rotor bus 156. Further, as shown, a rotor filter 134 is provided in the converter power path 132. More specifically, as shown, the rotor filter 134 is positioned between the rotor-side converter 166 and the stator 124 of the generator 120 so as to reduce harmonics. In such embodiments, the filter 134 may include an inductor filter or any other suitable filter. Therefore, the inductor size of the rotor filter 134, where applicable, can be much smaller. As such, the power level of the rotor filter 134 is much lower than stator filters of prior art systems. Further, the harmonics of the rotor filter 134 do not go through the generator 120, which reduces generator heating and allows for more power output from the generator 120.

The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control system 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 3:
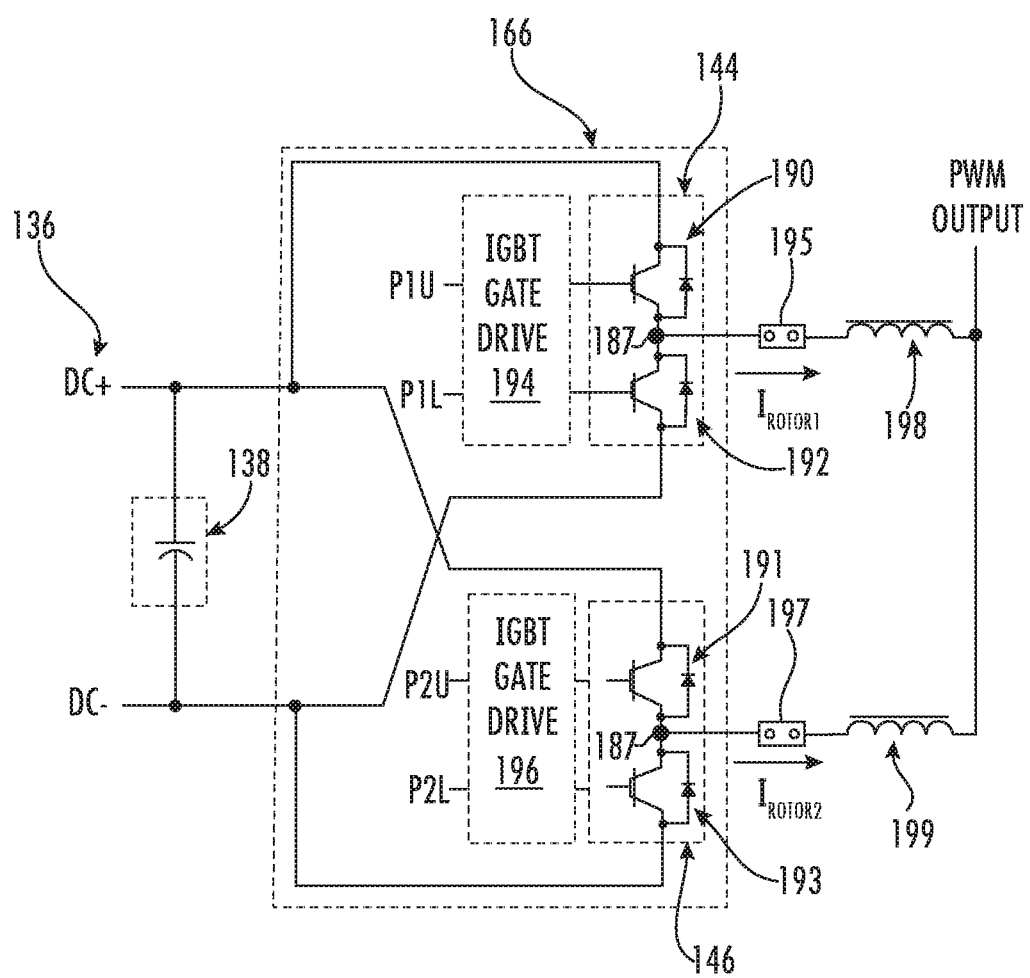
FIG. 3 illustrates a schematic diagram of one embodiment of the various components of a rotor-side converter according to the present disclosure, particularly illustrating one of the three phases.
Figure 4:
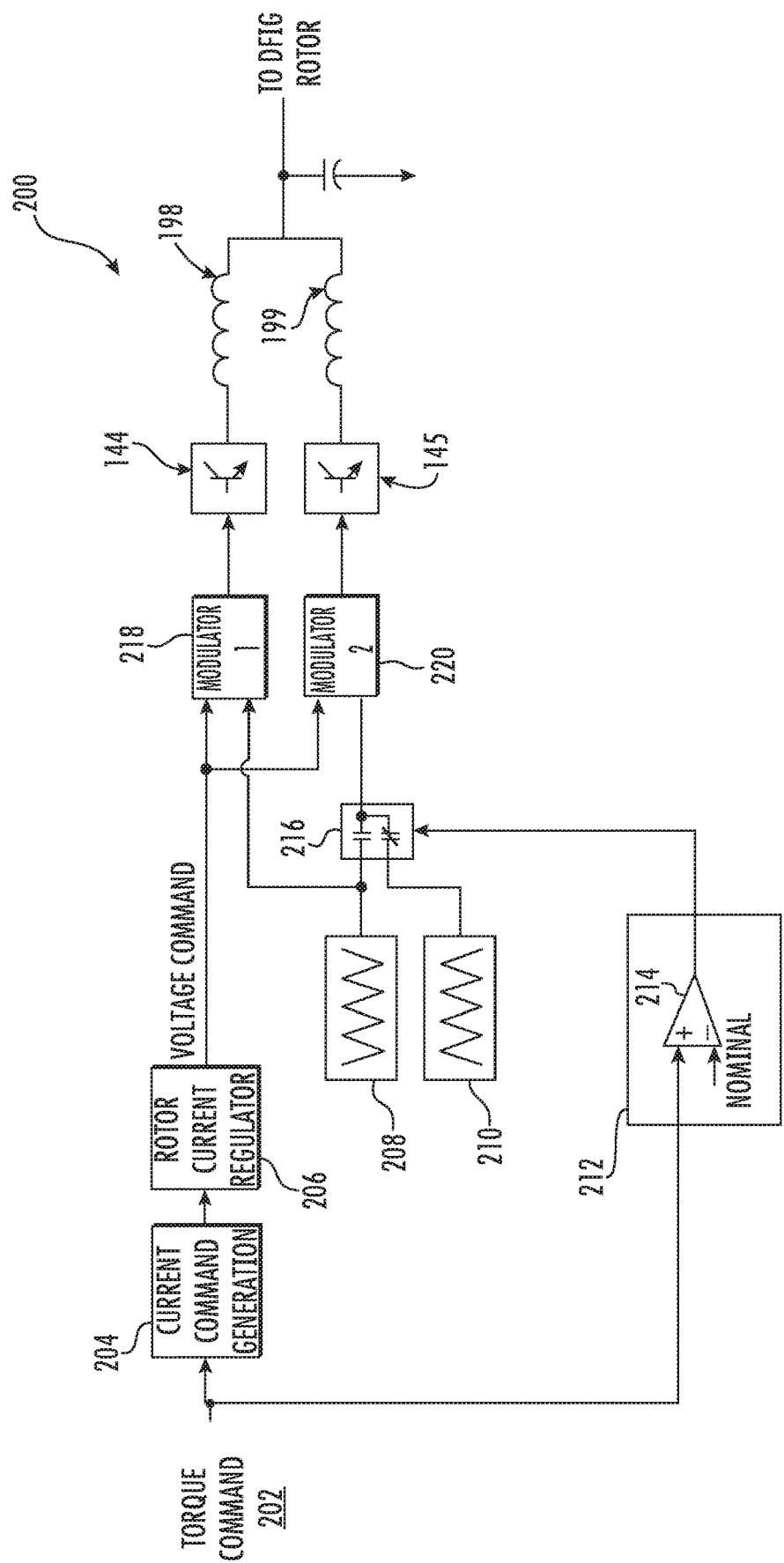
FIG. 4 illustrates a schematic diagram of one embodiment of the various components of a control system for operating a DFIG power system according to the present disclosure, particularly illustrating a system with two power bride circuits connected in parallel.
Figure 5:
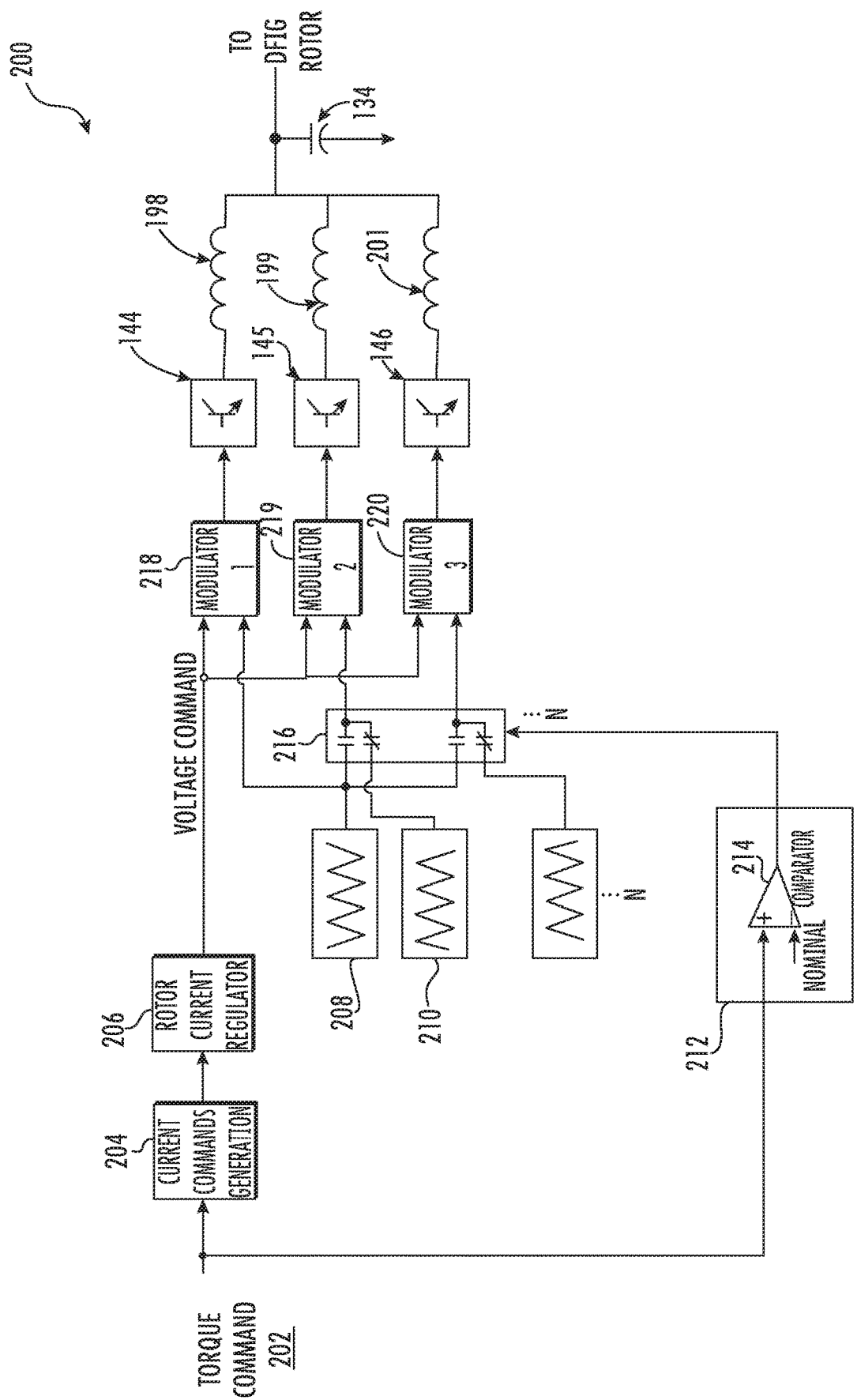
FIG. 5 illustrates a schematic diagram of one embodiment of the various components of a control system for operating a DFIG power system according to the present disclosure, particularly illustrating a system with three power bride circuits connected in parallel.

Referring now to FIGS. 3-5, various schematic diagrams of the rotor-side power converter 166 and the control schemes 200 for dynamically adjusting the interleave angle of the rotor-side converter 166 to reduce harmonics according to present disclosure are illustrated. More specifically, FIG. 3 illustrates a schematic diagram of one embodiment of the various hardware components of the rotor-side converter 166 according to present disclosure is illustrated. FIG. 4 illustrates a schematic diagram of one embodiment a control scheme 200 having two power bridge circuits 144, 145 for dynamically adjusting the interleave angle of the rotor-side converter 166. FIG. 5 illustrates a schematic diagram of one embodiment a control scheme 200 having three power bridge circuits 144, 145, 146 for dynamically adjusting the interleave angle of the rotor-side converter 166.

More specifically, as shown in FIG. 3, the rotor-side converter 166 includes two power bridge circuits 144, 145 connected in parallel. In another embodiment, as shown in FIG. 5, the rotor-side converter 166 includes at least three power bridge circuits 144, 145, 146 connected in parallel. Thus, it should be understood that the rotor-side converter 166 may include any number of power bridge circuits connected in parallel, including more than three.

Referring particularly to FIG. 3, each of the power bridge circuits 144, 145 includes one or more switching elements (i.e. 190, 192 and 191, 193, respectively) coupled in series with one another. It should be understood by those of ordinary skill in the art that the switching elements 190, 191, 192, 193 can be any suitable switching device, such as an IGBT (i.e. an insulated-gate bipolar transistor), power MOSFET (i.e. a metal-oxide semiconductor field-effect transistor), or other suitable switching device. For instance, as shown, the switching elements 190, 191, 192, 193 may correspond to IGBTs having a gate, a collector, and an emitter. In addition, as shown, the illustrated IGBTs 190, 191, 192, 193 can be coupled to an antiparallel diode. In addition, as shown, the power converter 162 may include an IGBT gate drive 194, 196 for each of the power bridge circuits 144, 145.

The switching elements 190, 191, 192, 193 can be controlled, for instance, by the control system 174 (FIGS. 1 and 2). Thus, pulse frequency modulation commands (e.g. gate drive commands) can be provided to one or more of the switching elements 190, 191, 192, 193 via the IGBT gate drive 194, 196. Each of the power bridge circuits 144, 145 may also be coupled to a rotor shunt 195, 197 which is coupled to a respective rotor reactor 198, 199 (and 201 for three-bridge systems). More specifically, as shown in FIG. 3, each of the rotor shunts 195, 197 is connected to a node 184, 187 between the IGBTs 190, 192 and 191, 193 of the respective power bridge circuits 144, 145.

Referring particularly to FIGS. 4 and 5, the control scheme 200 may receive a torque command 202 (or a current command). The torque command 202 is then used to generate a current command as shown at 204. The current command can then be used as an input to a rotor current regulator 206, which generates a voltage command. The voltage command is then input to respective modulators 218, 219 (and optionally 220) of the power bridge circuits 144, 145 (146). More specifically, the modulators 218, 219 (220) convert the desired analog voltages to PWM commands for the gate drives 194, 196 of the power bridge circuits 144, 145 (146) which amplify the PWM signals to levels needed by the IGBTs 190, 191, 192, 193 thereof.

The torque command 202 is also used by a transient overload detector 212 to monitor for transient overloading events. For example, as shown, the transient overload detector 212 may include a comparator 214 for comparing the torque command 202 to a predetermined threshold (e.g. a nominal value). More specifically, in one embodiment, the predetermined threshold is indicative of an occurrence of a transient overloading event. As such, if the torque command 202 is above the predetermined threshold, switch(es) 216 is configured to interleave phase angles of the power bridge circuits 144, 145 (146) to reduce harmonics of the DFIG power system 100, e.g. using first and second phase angles 208, 210. For example, in one embodiment, the first and second phase angles 208, 210 of the power bridge circuits 144, 145 may include a phase angle shift of 180 degrees (°).

In another embodiment, where the power converter 162 includes at least three power bridge circuits connected in parallel, as shown in FIG. 5, the phase angles of the power bridge circuits 144, 145, 146 may include a phase angle shift of 120 degrees (°), represented by the first, second, and third phase angles 208, 209, and 211. In further embodiments, it should be understood that any interleave angle may be any multiple of 360°/N, where N is the number of bridge circuits being interleaved. In further embodiments, the interleave angle may include angles less than 120°, between 120° and 180° and greater than 180°. In contrast, if the torque command 202 is less than the predetermined threshold, the switch(es) 216 is configured to operate the power bridge circuits 144, 145 (146) with equal phase angles. Thus, the control system 174 turns interleaving on and off, e.g. during transient overloads to avoid IGBT over temperature conditions. Though the circulating current will be higher during interleaving, harmonics are generally evaluated over longer time periods, therefore, such current increases will not negatively impact the evaluation. Further, the power converter 162 of the present disclosure is capable of a higher overload power, thereby reducing the power loss in the IGBTs during overloads.

Figure 6:
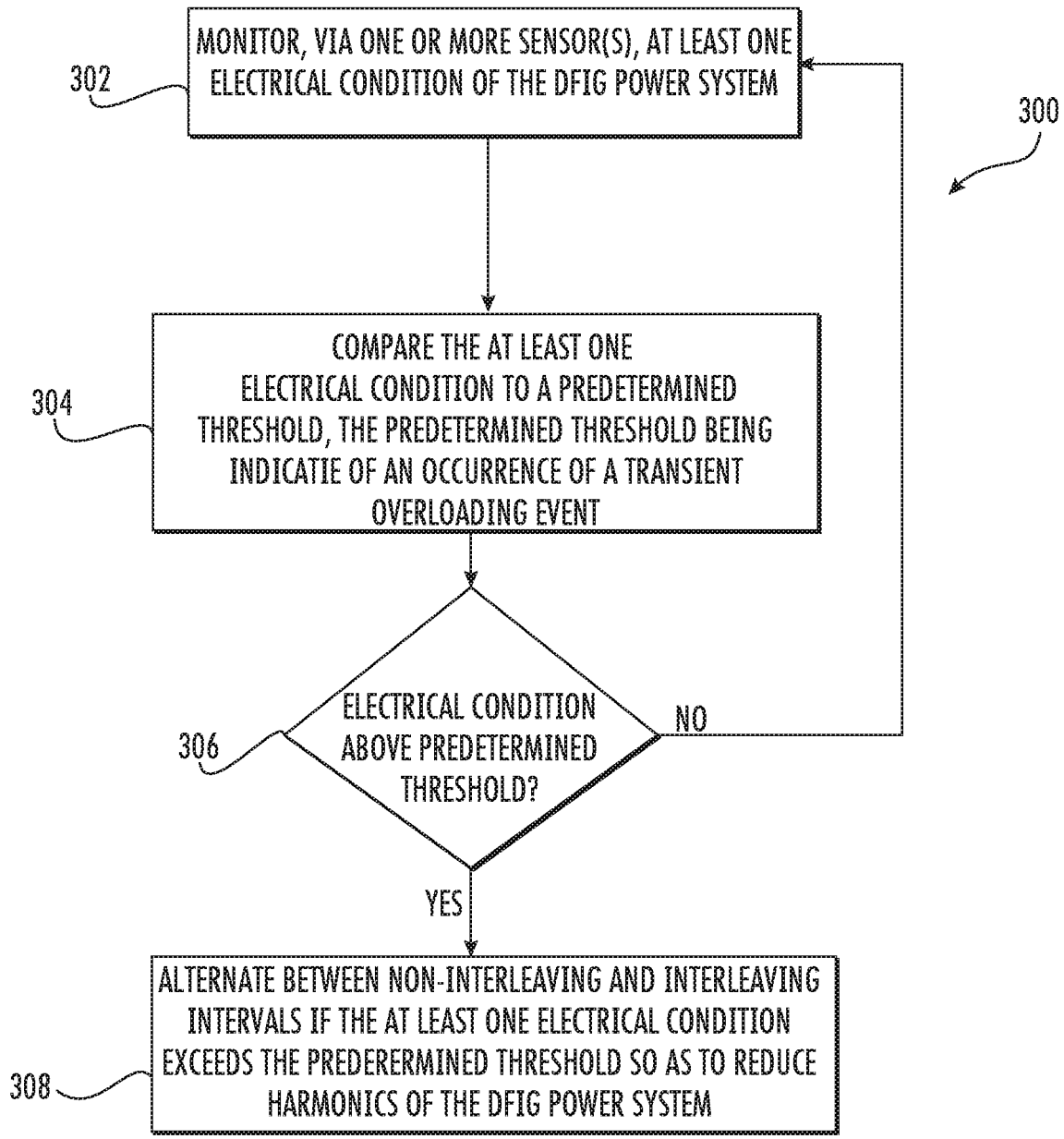
FIG. 6 illustrates a flow diagram of one embodiment of a method for operating a DFIG power system connected to a power grid according to the present disclosure.

Referring now to FIG. 6, a flow diagram of one embodiment of a method 300 for operating the DFIG power system 100 according to the present disclosure is illustrated. Further, FIG. 6 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure. As shown at 302, the method 300 includes monitoring, via one or more sensors (e.g. sensors 181, 183, 185), at least one electrical condition of the DFIG power system 100. For example, in one embodiment, the electrical condition(s) may include voltage, current, temperature, and/or frequency.

Thus, as shown at 304, the method 300 includes comparing, e.g. via the comparator 214 of a control system 174, the electrical condition(s) to a predetermined threshold. As mentioned, the predetermined threshold is indicative of an occurrence of a transient overloading event. Accordingly, as shown at 306, the method includes determining whether the electrical condition(s) is above the predetermined threshold. If so, as shown at 308, the method 300 may include alternating between non-interleaving and interleaving intervals if the electrical condition(s) exceeds the predetermined threshold so as to reduce harmonics of the DFIG power system 100. For example, in one embodiment, the normal interleaved operation may be used to reduce the harmonics, whereas the transition to non-interleaved operation is configured to avoid over-loading (e.g. heating) the power bridge circuits 144, 145 and/or to increase the capability of the power bridge circuits 144, 145 to ensure fundamental current by eliminating the circulating current. If the electrical condition(s) is not above the predetermined threshold, the method 300 continues monitoring the various electrical conditions to ensure that no transient overloading events are occurring.

In one embodiment, as shown in FIG. 4, where two power bridge circuits 144, 145 are connected in parallel, the phase angles during the interleaving interval may include a phase angle shift of 180 degrees (°). In alternative embodiments, as shown in FIG. 5, where three power bridge circuits 144, 145, 146 are connected in parallel, the phase angles during the interleaving interval may include a phase angle shift of 120 degrees (°).

Figure 7:
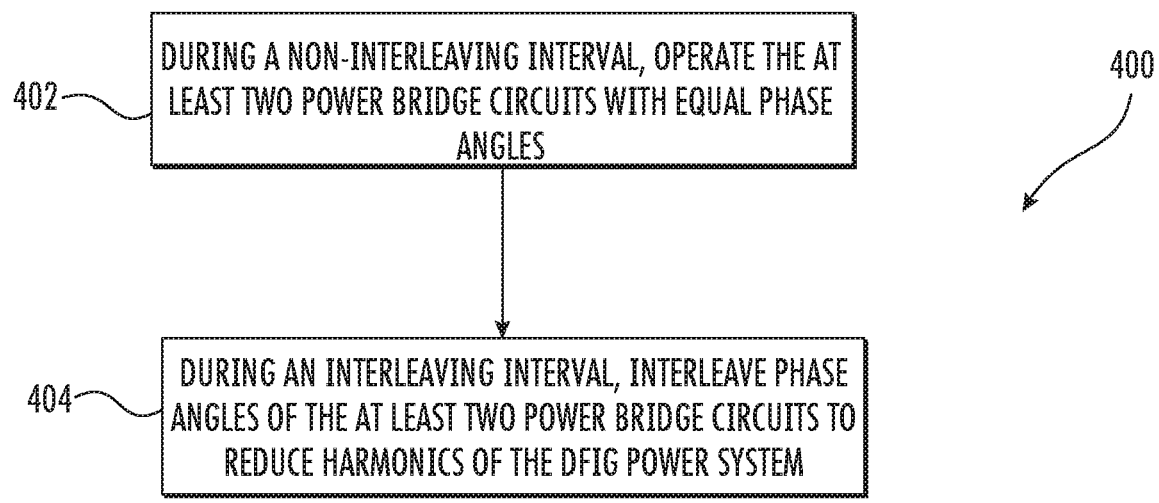
FIG. 7 illustrates a flow diagram of another embodiment of a method for operating a DFIG power system connected to a power grid according to the present disclosure.

Referring now to FIG. 7, a flow diagram of one embodiment of a method 400 for operating the DFIG power system 100 of the present disclosure is illustrated. As shown at 402, during a non-interleaving interval, the method 400 includes operating the power bridge circuits 144, 145, 146 with equal phase angles. Alternatively, as shown at 404, during an interleaving interval, the method 400 includes interleaving phase angles of the power bridge circuits 144, 145, 146 to reduce harmonics of the DFIG power system 100.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a doubly fed induction generator (DFIG) power system connected to a power grid, the DFIG power system defining a generator power path and a converter power path, the generator power path having a DFIG with a rotor and a stator, the converter power path having a power converter with a rotor-side converter coupled to a line-side converter via a DC link, the power converter having two power bridge circuits connected in parallel, the method comprising:
    connecting a rotor filter between the rotor-side converter and the generator in parallel with the at least two power bridge circuits, the rotor filter being an inductor filter having at least one capacitor;
    monitoring, via one or more sensors, a frequency of the rotor of the generator of the DFIG power system;
    comparing, via a control system, the frequency of the rotor to a predetermined threshold, the predetermined threshold being indicative of an occurrence of a transient overloading event; and,
    dynamically adjusting an interleave angle between the two power bridge circuits as a function of the frequency so as to reduce harmonics of the DFIG power system.

2. The method of claim 1, wherein phase angles of the at least two power bridge circuits comprise a phase angle shift of 180 degrees (°) of a pulse width modulation (PWM) carrier frequency.

3. The method of claim 1, wherein the power converter comprises at least three power bridge circuits connected in parallel, wherein phase angles of the at least three power bridge circuits comprise a phase angle shift of 120 degrees (°) of a pulse width modulation (PWM) carrier frequency.

4. The method of claim 1, wherein the DFIG power system comprises at least one of a wind turbine power system or a solar power system.

5. A doubly fed induction generator (DFIG) power system connected to a power grid, the DFIG power system comprising:
    a generator power path comprising a DFIG with a rotor and a stator;
    a converter power path comprising a power converter, the power converter comprising a rotor-side converter coupled to a line-side converter via a DC link, the power converter comprising at least two power bridge circuits connected in parallel, the converter power path comprising a rotor filter between the rotor-side converter and the DFIG in parallel with the two power bridge circuits, the rotor filter being an inductor filter having at least one capacitor;
    one or more sensors for monitoring a frequency of the rotor of the generator of the DFIG power system; and,
    a control system communicatively coupled to the one or more sensors, the control system configured to perform one or more operations, the one or more operations comprising:
        comparing the frequency to a predetermined threshold; and,
        dynamically adjusting an interleave angle between the two power bridge circuits as a function of the frequency so as to reduce harmonics of the DFIG power system.

6. The DFIG power system of claim 5, wherein phase angles of the at least two power bridge circuits comprise a phase angle shift of 180 degrees (°) of a pulse width modulation (PWM) carrier frequency.

7. The DFIG power system of claim 5, wherein the power converter comprises at least three power bridge circuits connected in parallel, wherein phase angles of the at least three power bridge circuits comprise a phase angle shift of 120 degrees (°) of a pulse width modulation (PWM) carrier frequency.

8. The DFIG power system of claim 5, wherein each of the power bridge circuits comprise at least one insulated-gate bipolar transistor (IGBT).

9. The DFIG power system of claim 5, further comprising at least one of a rotor shunt or a rotor reactor coupled to each of the power bridge circuits.

10. The DFIG power system of claim 5, further comprising a modulator configured to convert a voltage value to a pulse-width-modulated command for each of the power bridge circuits.

11. The DFIG power system of claim 8, further comprising an IGBT gate drive coupled to the at least one IGBT.

12. The DFIG power system of claim 5, wherein the DFIG power system comprises at least one of a wind turbine power system or a solar power system.

* * * * *